United States Patent
Schnabel et al.

(10) Patent No.: US 12,156,033 B2
(45) Date of Patent: Nov. 26, 2024

(54) SECURELY SHARING PRIVATE INFORMATION

(71) Applicant: HID Global CID SAS, Suresnes (FR)

(72) Inventors: Uwe Schnabel, Erfurt (DE); Philip Hoyer, Richmond (GB)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 18/334,822

(22) Filed: Jun. 14, 2023

(65) Prior Publication Data

US 2023/0337000 A1    Oct. 19, 2023

Related U.S. Application Data

(63) Continuation of application No. 17/596,880, filed as application No. PCT/EP2020/067162 on Jun. 19, 2020, now Pat. No. 11,722,901.

(Continued)

(51) Int. Cl.
*H04L 29/06* (2006.01)
*H04B 10/11* (2013.01)
(Continued)

(52) U.S. Cl.
CPC ............ *H04W 12/30* (2021.01); *H04B 10/11* (2013.01); *H04L 9/0819* (2013.01); *H04W 12/02* (2013.01);
(Continued)

(58) Field of Classification Search
CPC .. H04L 9/0819; H04L 2209/80; H04W 12/02; H04W 12/03; H04W 12/041; H04W 12/06
See application file for complete search history.

(56) References Cited

U.S. PATENT DOCUMENTS 6,373,946 B1    4/2002  Johnston
11,722,901 B2   8/2023  Schnabel et al.
(Continued)

FOREIGN PATENT DOCUMENTS

CA    2335968 A1 *  1/2000
CA    2386805 A1 *  4/2001
(Continued)

OTHER PUBLICATIONS

"European Application Serial No. 23168322.8, Extended European Search Report mailed Jun. 19, 2023", 5 pages.
(Continued)

*Primary Examiner* — Shawnchoy Rahman
(74) *Attorney, Agent, or Firm* — Schwegman Lundberg & Woessner, P.A.

(57) ABSTRACT

Various systems and methods for securely sharing private information are described herein. A mobile device comprises instruction to configured the mobile device to identify a verifier device having an available wireless connection, the wireless connection having a wireless connection strength; determine that a triggering event occurs, the triggering event based on the wireless connection strength; when the triggering event occurs; connect to the verifier device; transmit a digital credential to the verifier device, each of a plurality of data elements of the digital credential separately encrypted using distinct encryption keys; receive a request to access a requested data element of the digital credential; prompt a user of the mobile device for consent to share the requested data element; and transmit information to the verifier device when the user consents sharing the requested data element, the information used to decrypt only the requested data element.

20 Claims, 7 Drawing Sheets

Related U.S. Application Data

(60) Provisional application No. 62/864,917, filed on Jun. 21, 2019.

(51) Int. Cl.

| | | |
|---|---|---|
| *H04L 9/08* | (2006.01) | |
| *H04W 12/02* | (2009.01) | |
| *H04W 12/03* | (2021.01) | |
| *H04W 12/041* | (2021.01) | |
| *H04W 12/06* | (2021.01) | |
| *H04W 12/30* | (2021.01) | |
| *H04W 12/63* | (2021.01) | |

(52) U.S. Cl.
CPC ......... *H04W 12/03* (2021.01); *H04W 12/041* (2021.01); *H04W 12/06* (2013.01); *H04W 12/63* (2021.01); *H04L 2209/80* (2013.01)

(56) References Cited

U.S. PATENT DOCUMENTS

| | | | |
|---|---|---|---|
| 11,880,828 B2 * | 1/2024 | Alastair | ............. H04L 9/32 |
| 2009/0183008 A1 | 7/2009 | Jobmann | |
| 2017/0070487 A1 | 3/2017 | Greenberg et al. | |
| 2018/0144563 A1 | 5/2018 | Reymann | |
| 2022/0198046 A1 * | 6/2022 | Moore | ............. H04L 9/3213 |
| 2022/0312195 A1 | 9/2022 | Schnabel et al. | |
| 2022/0405765 A1 * | 12/2022 | Bekiyants | ........... H04L 63/0861 |

FOREIGN PATENT DOCUMENTS

| | | |
|---|---|---|
| CN | 1633665 | 6/2005 |
| CN | 102780556 | 11/2012 |
| CN | 104885093 | 9/2015 |
| CN | 106664554 | 5/2017 |
| CN | 107004051 | 8/2017 |
| CN | 114175578 | 3/2022 |
| EP | 3977700 | 4/2023 |
| KR | 20190086848 | 7/2019 |
| KR | 102494979 | 2/2023 |
| WO | 2020254614 | 12/2020 |

OTHER PUBLICATIONS

"European Application Serial No. 23168322.8, Response Filed Jan. 18, 2024 to Extended European Search Report mailed Jun. 19, 2023", 12 pages.

"International Application Serial No. PCT EP2020 067162, International Search Report mailed Aug. 11, 2020", 5 pgs.

"International Application Serial No. PCT EP2020 067162, Written Opinion mailed Aug. 11, 2020", 6 pgs.

"Application Serial No. 17 596,880, Preliminary Amendment filed Dec. 20, 2021", 8 pgs.

"International Application Serial No. PCT EP2020 067162, International Preliminary Report on Patentability mailed Dec. 30, 2021", 8 pgs.

"Chinese Application Serial No. 202080048814.6, Notification to Make Rectification mailed Jan. 27, 2022", w o English Translation, 1 pg.

"Chinese Application Serial No. 202080048814.6, Response filed Feb. 11, 2022 to Notification to Make Rectification mailed Jan. 27, 2022", w o English Translation, 26 pgs.

"European Application Serial No. 20733996.1, Response Filed Mar. 6, 2023 to Communication Under Rule 71(3) mailed Nov. 9, 2022", 16 pgs.

"U.S. Appl. No. 17/596,880, Notice of Allowance mailed Mar. 16, 2023", 12 pgs.

Kinneging, T A F, "Machine Readable Travel Documents Technical Report—PKI for Machine Readable Travel Documents offering ICC Read-Only Access", [Online] Retrieved from the Internet:, URL: http: www.i cao.i nt mrtddownload documents TR-PKI%20mrtds%20ICC%20read-only%20access%20vl I.pdf#search=%22PKI%20FOR%20MACHINE%20READABLE%20TRAVEL%20DOCUMENTS%20OFFERING%20ICC%20READ-ONLY%20ACCESS%22[Retrieved Aug. 29, 2006], (Oct. 1, 2004), 57 pgs.

Popa, Raluca, "Cryptdb: Protecting Confidentiality with Encrypted Query Processing", Proceedings of the 23rd ACM Symposium on Operating Systems Principles, (2011), 16 pgs.

U.S. Appl. No. 17/596,880, filed Dec. 20, 2021, Securely Sharing Private Information.

"Chinese Application Serial No. 202080048814.6, Office Action mailed Dec. 16, 2023", with English translation, 20 pages.

* cited by examiner

SECURELY SHARING PRIVATE INFORMATION

CROSS-REFERENCE TO RELATED APPLICATION(S)

This application is a continuation of U.S. patent application Ser. No. 17/596,880, titled "Securely Sharing Private Information," filed Dec. 20, 2021, which is a national stage application under 35 U.S.C. § 371 of PCT Appl. No. PCT/EP2020/067162, titled "Securely Sharing Private Information," filed Jun. 19, 2020, which claims priority to U.S. Prov. Pat. Appl. No. 62/864,917, titled "System and Method for Securely Sharing Private Information," filed Jun. 21, 2019, each of which is hereby incorporated by reference herein in its entirety.

TECHNICAL FIELD

Embodiments described herein generally relate to electronic credential systems, and in particular, to securely sharing private information.

BACKGROUND

Identity documents, such as identity cards, may have multiple pieces of information stored on them Some countries have begun a move to national identification cards that includes a microchip or integrated circuit that electronic stores information. A national identification card may include basic information, such as a person's name, home address, date of birth, age, or gender. Additionally, a national identity card may include security mechanisms such as an electronic security certificate, anti-counterfeit printing techniques, or seals.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
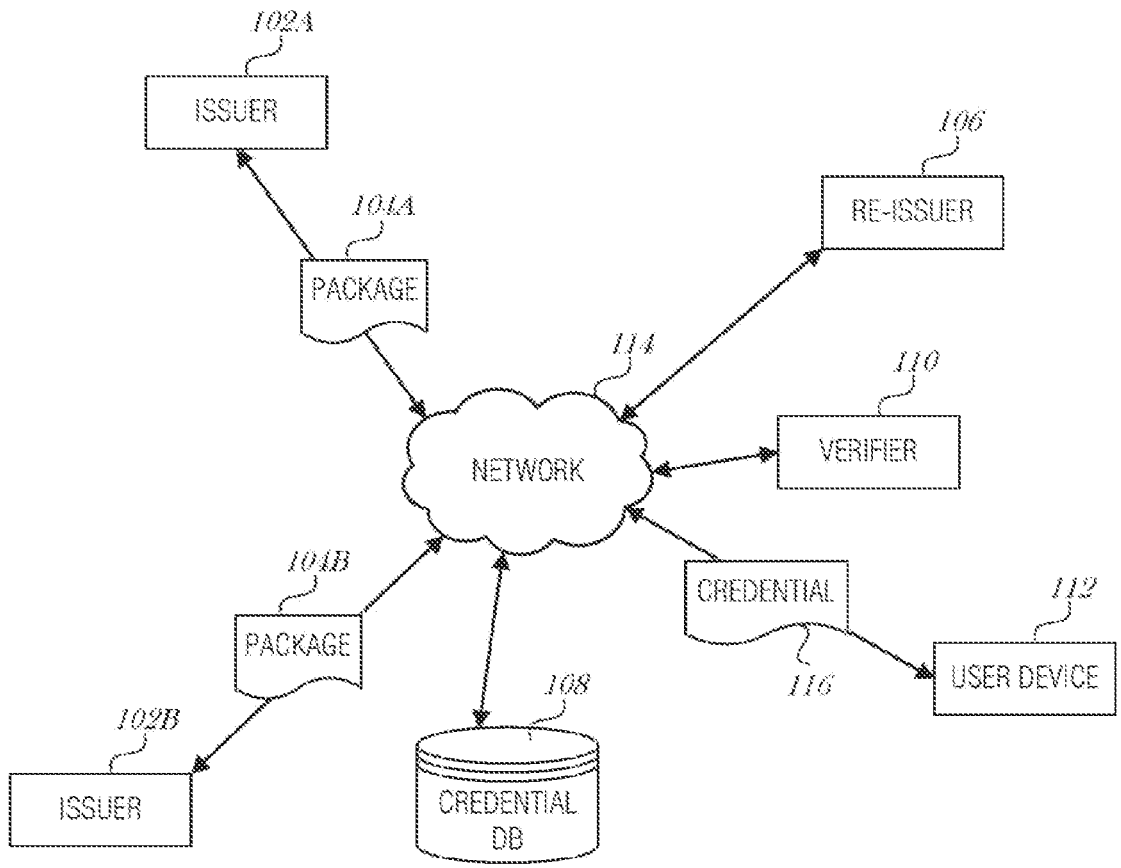
FIG. 1 is a block diagram illustrating a credential system, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Personal electronic identity cards are becoming more popular. Such cards may be issued by governments, schools, health care systems, or the like. To use a personal electronic identity card, a card reader is used to read some, or all of the information contained on the card. It may take several seconds to read the information on the card. This delay impacts the user experience and may reduce the adoption rate of identity card technology. In order to provide a better user experience and promote faster adoption of identity card use, a more powerful, scalable, and faster transmission protocol is needed. In addition, because much of the personal identity card contents may be sensitive, classified, or private, the improved transmission protocol provides a secure mechanism.

The present disclosure describes an improved credential system that provides a secure process to transmit credential information from a credential to a credential reader without impacting user experience. Additional features are discussed below.

System Overview

Identity credentials (e.g., electronic documents, cards, mobile profiles, etc.) include information such as a first and last name, a date of birth, an address, etc. In the digital world, each piece of information is a data element and these data elements are combined into a package that is issued to a target user Having a digital credential provides several advantages. Information and documentation are easy to access. The information is centralized and may be stored in a network location, providing backup and redundancy. Digital credentials may also be more immune to counterfeiting and corruption than conventional credentials.

Some terms are provided here for common reference. It is understood that these terms are non-limiting and that other terms, phrases, or descriptions of operations, components, or devices in the systems and methods described may be used.

Package—a Package is a collection of name:value pairs of data. The name of the data pair may be referred to as a Tag, Field, or Description. A Package may include metadata about the Package, such as a Package Hash, Package Signature, Package Expiration, or the like.

Credential—a Credential is an encapsulation of one or more packages. An aggregated credential includes two or more packages. A credential may include metadata describing the issuer of the credential, expiration or validity dates, or other information about the credential.

Issuer—an Issuer is a person, entity, service, or other platform that provides a Package. The Issuer may attest to the authenticity, validity, and correctness of data contained in the Package. The Issuer may sign the Package or sign individual data in the Package. The Issuer may be an Original Issuer, which is an Issuer that created the data, or a Re-Issuer, which is one that reuses the Original Issuer's data. An Issuer or Re-issuer may issue a Package as a Credential.

Data that is provided by an Issuer may have an associated Assurance Level. An Assurance Level is an indication of the trustworthiness of the data. The Assurance Level may be a numerical range, a letter grade, or other indication. Data issued by an Original Issuer may have the highest Assurance Level. As data is reused and republished by Re-Issuers in derivative Packages, the Assurance Level may decrease stepwise. By analyzing the Assurance Level of data contained in a Package, one may be able to see how many steps away the data in the current Package is from the Original Issuer.

Verifier—a Verifier is a device, person, entity, service, or other platform that verifies data in a Package or Credential. A Verifier may obtain data from a user Credential, for example a point-of-sale, and then contact one or more Issuers to validate the data. Other forms of validation may be used, such as by analyzing data signatures, analyzing a blockchain, or the like.

FIG. 1 is a block diagram illustrating a credential system 100, according to an embodiment. The credential system 100 includes a first original issuer 102A and a second original issuer 102B (collectively referred to as 102) that issue core packages 104A, 104B (collectively referred to as 104). The core packages 104 include tags and values that are generated by the original issuers 102. The credential system 100 also includes re-issuers 106A, 106B (collectively referred to as 106) that compile data from one or more issuers (or re-issuers) in the credential system 100 and re-issues an aggregated credential with contents from two or more packages.

The re-issuer 106 may also add its own data to the aggregate credential by issuing its own package and consolidating the package with data from packages of other issuers 102. The re-issuer 106 may sign its own package, portions of its own package, or the aggregated credential.

In the example illustrated in FIG. 1, the first original issuer 102A is a government agency that issues birth certificates (e.g., a Public Health Office of a county). The first original issuer 102A is the place where the user's name, date of birth (DOB), and place of birth are first recorded. The second original issuer 102B is a vehicle manufacturer that produces vehicles. Each vehicle produced is uniquely identified with a vehicle identification number (VIN). The second original issuer 102B creates a package with data describing a vehicle.

The re-issuer 106A may be a government agency that produces packages for vehicle titles (e.g., a Department of Motor Vehicles (DMV)). The vehicle title is identified with a title identifier that uniquely identifies the title. Consequently, the aggregate credential produced by the re-issuer 106A may include: the vehicle title identifier, as issued by the re-issuer 106A; some or all of information from a package from first original issuer 102A describing an owner's personal information; and some or all of information from a package from the second original issuer 102B describing the vehicle.

The re-issuer 106B may be an insurance company that provides motor vehicle insurance. The re-issuer 106B may produce a policy number that identifies an insurance policy for the vehicle. The package that includes the policy number may also include, using actual values or values by reference, information about the insured party (e.g., data from package created by issuer 102A), information about the vehicle being insured (e.g., data from package created by issuer 102B), and information about the vehicle title (e.g., data from aggregate credential produced by re-issuers 106A).

A credential database 108 may be used to store packages and other data from one or more issuers 102 or re-issuers 106. The credential database 108 may use a relational database management system (RDBMS) to organize the package information into tables. The credential database 108 may be queried by various entities or users, such as a re-issuer 106, a verifier 110, or a user at a user device 112. A re-issuer 106 may query the credential database 108 to obtain original package information to populate an aggregated credential. The credential database 108 may be implemented on one or more servers, which may be owned or operated by a credential issuing entity. In some embodiments, credential issuing entities access the credential database 108 as part of a service.

The various components of the credential system 100 may communicate over one or more networks 114, which may include any known type of network that facilitates machine-to-machine communications. The network 114 may use the same communication protocols or different protocols without departing from the scope of the present disclosure. The network 114 may include wired or wireless communication technologies. The Internet is an example of a communication network that constitutes an Internet Protocol (IP) network consisting of many computers, computing networks, and other communication devices located all over the world, which are connected through many telephone systems and other means. Other examples of a communication networks include, without limitation, a Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 114 need not be limited to any one network type, and instead may be comprised of several different networks or network types. Moreover, the network 114 may include a number of different communication media such as coaxial cable, copper cable/wire, fiber-optic cable, antennas for transmitting/receiving wireless messages, and combinations thereof.

The user device 112 and verifier device 110 may be of any type of compute device. The user device 112 is typically portable in nature, and may take the form of a cellular phone, mobile device, smart phone, personal digital assistant, laptop, tablet, wearable device, portable credential card, key fob, or the like. It should be appreciated that the verifier device 110 does not necessarily have to correspond to a mobile device, but rather may correspond to a personal computer, desktop computer, kiosk, payment terminal, beacon, or the like.

During a transaction, a user with the user device 112 may be asked to present a credential 116 or part of a credential 116 to a verifier device 110. The verifier device 110 may be a point-of-sale terminal with a beacon, for example. The beacon may periodically attempt to connect with user devices 112 in communication range or within some threshold proximity. The verifier device 110 may connect with the user device 112 over wireless communications (e.g., BLUETOOTH® or WI-FI), and obtain some or all of a credential 116 from the user device 112. For instance, as the user approaches the checkout lane, the beacon may advertise a connection, which the user device 112 uses to connect with the beacon and construct a secure connection. The beacon may request certain credential information, such as a user's name and credit card number, and the user device 112 may respond with the information. The user may selectively share portions of the credential 116 to the verifier device 110 to maintain as much personal privacy as possible. The verifier device 110 may validate the credential 116 by accessing an issuer 102, re-issuer 106, or credential database 108.

Depending on how the system is organized, the user device 112 may obtain one or more credentials 116 from one or more issuers 102 or re-issuers 106. For instance, the user may obtain a driving license credential from a government motor vehicles agency and a health care identification card from a health insurance company. Alternatively, the user may obtain a composite credential that includes a package from the government motor vehicles agency and another package from the health insurance agency.

Figure 2:
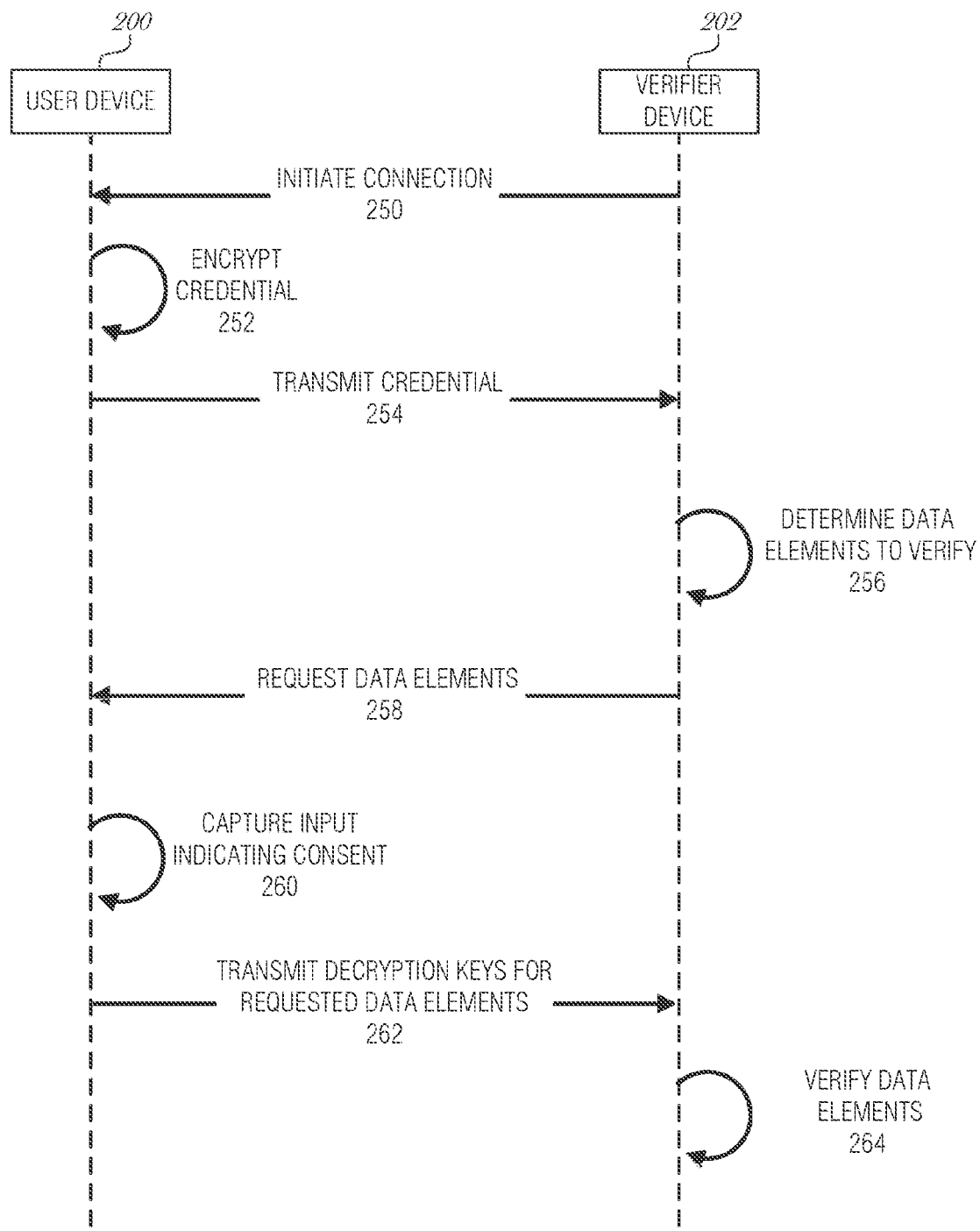
FIG. 2 is a message sequence diagram illustrating an interaction between a user device and a verifier device, according to an embodiment.

FIG. 2 is a message sequence diagram illustrating an interaction between a user device 200 and a verifier device 202, according to an embodiment. While the various processes will be described in accordance with illustrative steps performed in a particular order, it should be appreciated that embodiments of the present disclosure are not so limited and that any of the process steps depicted and described herein can be performed in any order or in parallel with one another.

In conventional interactions, a user with a user device may form the intention to interact with a verifier device, for example, by initiating an airline check-in procedure with an airline kiosk. The user may tap the user device against the kiosk to begin a check-in procedure. After the tap, it may take several seconds (e.g., 8-12 seconds) for the user device to transmit the user's credential to the kiosk, which is acting as the verifier device, for verification. Once the credential is at the verifier device, the verifier device may prompt the user via the user device for consent to access one or more data elements in the credential. This delay causes annoyance and a reduced user experience.

In contrast, the improved process illustrated in FIG. 2 provides a quicker user interaction, which many users expect in today's electronic world. When a user device 200 is within wireless communication range of a verifier device 202, the verifier device 202 may initiate a wireless connection (operation 250). The wireless connection may be formed over any type of wireless communication protocol including, but not limited to BLUETOOTH®, BLUETOOTH LOW ENERGY (BLE), WI-FI, ZIGBEE, or the like.

The user device 200 encrypts each data element in a credential using a separate, independent encryption key (operation 252) The encryption may be performed before, during, or after the wireless connection is formed in operation 250. The encryption may be performed using an ephemeral key. An ephemeral key is typically a single-use key for a single session or interaction. An ephemeral key may be a symmetric key or an asymmetric key (Public Key Infrastructure (PKI)).

The user device 200 transmits the contents of the credential to the verifier device 202 as separately encrypted data elements (operation 254). The advantage here is that the transmission of the data elements (i.e., credential) is performed before the user begins the interaction with the verifier device 202 or a human operator of the verifier device 202. By transmitting the data element preemptively, the real-world delay experienced by the user is reduced or eliminated.

As such, instead of encrypting an entire credential with a key, the credential is encrypted on a part-by-part basis. Each part, which may include one or more data elements, are encrypted separately and transmitted before the user interacts with the verifying agent. By encrypting the credential piecewise, the user's information is secured better than if the credential were encrypted entirely as one unit. This is because the user may desire to consent to share only parts of a credential. If the credential is encrypted with one key, then the user's consent to share some of the credential may allow a verifier to inspect all of the credential-even though the user only wanted to share a portion of the credential. By separately encrypting the credential's parts, the user is provided a finer-grained control over the sharing.

Credentials may be of varying sizes. Encryption may increase the datafile size of a credential or of its constituent parts. The pre-sharing process described here may become cumbersome to a user device 200 when in an area that includes several verifier devices 202. For example, in an airport, a user device 200 may be interrogated by verifier devices 202 at convenience stores (e.g., checkout terminal), terminal gates (e.g., boarding pass readers), security gates (e.g., passport controls), restaurants, newsstands, casino games, or other devices. The user device's power may be drained quickly by all of the pre-sharing to such potential verifier devices 202. As such, in an embodiment, the transmission operation (operation 254) may be conditioned on a triggering event.

The triggering event may be a threshold received signal strength indicator (RSSI) of a wireless signal between the user device 200 and the verifier device 202. RSSI is a measurement of how well one device is able to receive a signal from another device. In other terms, RSSI is an estimated measurement of power level that a radio-frequency (RF) client is receiving from a transmitting device. In an IEEE 802.11 system, RSSI is the relative received signal strength in a wireless environment, in arbitrary units. Thresholds may also be based on absolute values of the received signal, such as measured in milliwatts (mW) or decibel-milliwatt (dBm). The transmitting device may be a BLUETOOTH advertiser, wireless hotspot, access point, or the like.

In another implementation, the triggering event may be based on a proximity assessment representing a distance between the verifier device and the mobile device. Other triggering events may be used. For instance, the RSSI difference between the first and a potential second verifier device, such that when one verifier device's RSSI is stronger than another's RSSI, the user device 200 may communicate with the device with the stronger RSSI. The rate of change or the absolute value of an increase of the RSSI value of the verifier device with the highest RSSI value may be used to identify a verifier device 202 to communicate with. Any combination of absolute value, relative value, and change rate of a verifier's RSSI value may be used to select a verifier device. A radio communication method (either in band as described for Bluetooth or using a separate radio communication technology such as UWB-Ultra Wide Band) allowing a distance measurement or estimation may also be used to select a verifier device from several potential verifier devices. Further, mechanisms that allow the determination of the credential position to the verifier such as angle of arrival (AoA) or time of flight (ToF) may be used to determine relative position between the user device and verifier device, and as a basis for triggering events.

It should be noted that a wireless connection used to determine a proximity assessment between the verifier device 202 and the user device 200 may be the same or different than the wireless connection used to communicate credential information or other session information. Proximity assessments may be referred to as distance measurements or ranging. Multiple types of wireless technologies may be used for ranging including but not limited to Ultra Wide Band (UWB), Bluetooth Low Energy (BLE), or the like.

In some implementations, BLE is used with AoA or triangulation (e.g., when using BLE beacons for location services). In other implementations, proximity assessment may include GPS indoor services or WLAN triangulation. Anything coming from location services or ranging (estimated or measured) may be used in the triggering event.

When a triggering event occurs, such as when the RSSI of a user device 200 is over a threshold amount, then the verifier device 202 may establish a wireless connection to interrogate the user device 200 for a credential. Alternatively, or in combination with such operation, the user device 200 may also use similar triggering events of the verifier device 202 to determine whether to respond to a particular credential request. This reduces the user interface queries to the user on the user device so that the user is not inundated with credential consent requests.

In the situation where there are multiple verifier devices 202, then the triggering event of each may be used to determine which, if any, of the verifier devices 202 the user device 200 will interact with.

In addition, or in the alternative, the rate of change of an RSSI (or inferred distance) may be used to identify which verifier device 202 the user device 200 is to interact with. As the user approaches a verifying agent (e.g., as an airplane passenger approaches a gate attendant), the user device 200 may track that the verifier device 202 is getting closer (or vice versa) using RSSI. The rate of change may be used as a secondary indicator that the user device 200 it to interact with the verifier device 202. For instance, a threshold RSSI may be used with a threshold rate of change.

In addition, or in the alternative, the triggering event may be an out-of-band criterium. The out-of-band criterium may be a user action (e.g., a user interaction with the user device 200 to select a verifier device 202), a QR code scan, an NFC tap, or other activity that is used to disambiguate the verifier-user device relationship.

After receiving the parts of the credential, the verifier device 202 determines which data elements are needed to verify the user device 200 (operation 256). The verifier device 202 may have a predetermined list of data elements to verify. Alternatively, the verifier device 202 may analyze the structure of the credential and determine which of the data elements to verify from those that are present in the credential. As an example, the credential may include a header field, which includes a list of the data elements or the types of data elements contained within the credential. The credential may have metadata describing the type of credential, contents, version, issuer, or other information about the credential. Based on the header field, the type of credential, metadata, or other information, the verifier device 202 is able to determine which data elements should be exposed for proper verification.

The verifier device 202 then transmits data or instructions to the user device 200 to initiate the user device 200 to prompt the user of the user device 202 for consent to share the needed data elements (operation 258).

The user device 200 captures the user input consenting to share some or all of the data elements requested by the verifier device 202 (operation 260) and transmits the decryption keys for those data elements to the verifier device 202 (operation 262). For instance, the user may be presented with a list of items that the verifier device 202 is requesting, such as the user's name, driver's license number, and date of birth. The user may interact with the user device 200 to select one or more items, such as with a touch-sensitive display to choose a user interface control indicating selection of an item. The selection of the item and optional other user interface controls may be used then to indicate the user's consent to share the selected items with the verifier device 202.

The decryption keys are transmitted to the verifier device 202 in operation 262. The decryption keys may be one-time use keys, ephemeral keys, limited time keys, or other short-term or limited-use keys. Once the verifier device 202 obtains the keys for the requested data elements, the data elements are decrypted and verified (operation 264).

The verifier device 202 may perform a variety of verification operations on the data elements, including but not limited to verifying an issuer of the data element, verifying the integrity of the data element, verifying the document type associated with the data element, and the like. Verifying the issuers of the data element may be performed by verifying a digital signature of the issuer associated with the data element. Verifying the integrity of the data element may be performed by verifying a hash of the data element, a checksum of the data element, a blockchain, or the like. Verifying the document type associated with the data element may be performed by verifying a file extension, a digital format, a header block, or the like. Verification may be performed at the verifier device 202 or in conjunction with a secondary device, such as a cloud service, a remote server, a companion device, or the like. Other types of verification and verification procedures are understood to be included in the scope of these verification operations.

In various embodiments, multiple thresholds may be used with each threshold initiating a separate respective triggering event. For instance, as a person approaches a verifier device, when the distance is within a first threshold, then ephemerally encrypted data may be shared. As the person continues to get closer to the verifier device, a second threshold distance is crossed, and a consent prompt may be presented to the user to share decryption keys with a verifier device within the second threshold distance range. As such, in a crowded scenario (e.g., border crossing or event venue entry), the first threshold may be set to 20 meters and the second threshold may be set to 3 meters. The thresholds may be set according to the particular scenario. As such, more or fewer thresholds with longer or shorter ranges may be used. In the interest of power saving, the ranging or location frequency may be very low while the mobile device is outside of the first threshold distance. When the mobile device is between the first and second threshold distances, the ranging/location frequency may be increased. This may be through a stepwise increase, a linear increase, or other mechanisms.

Figure 3:
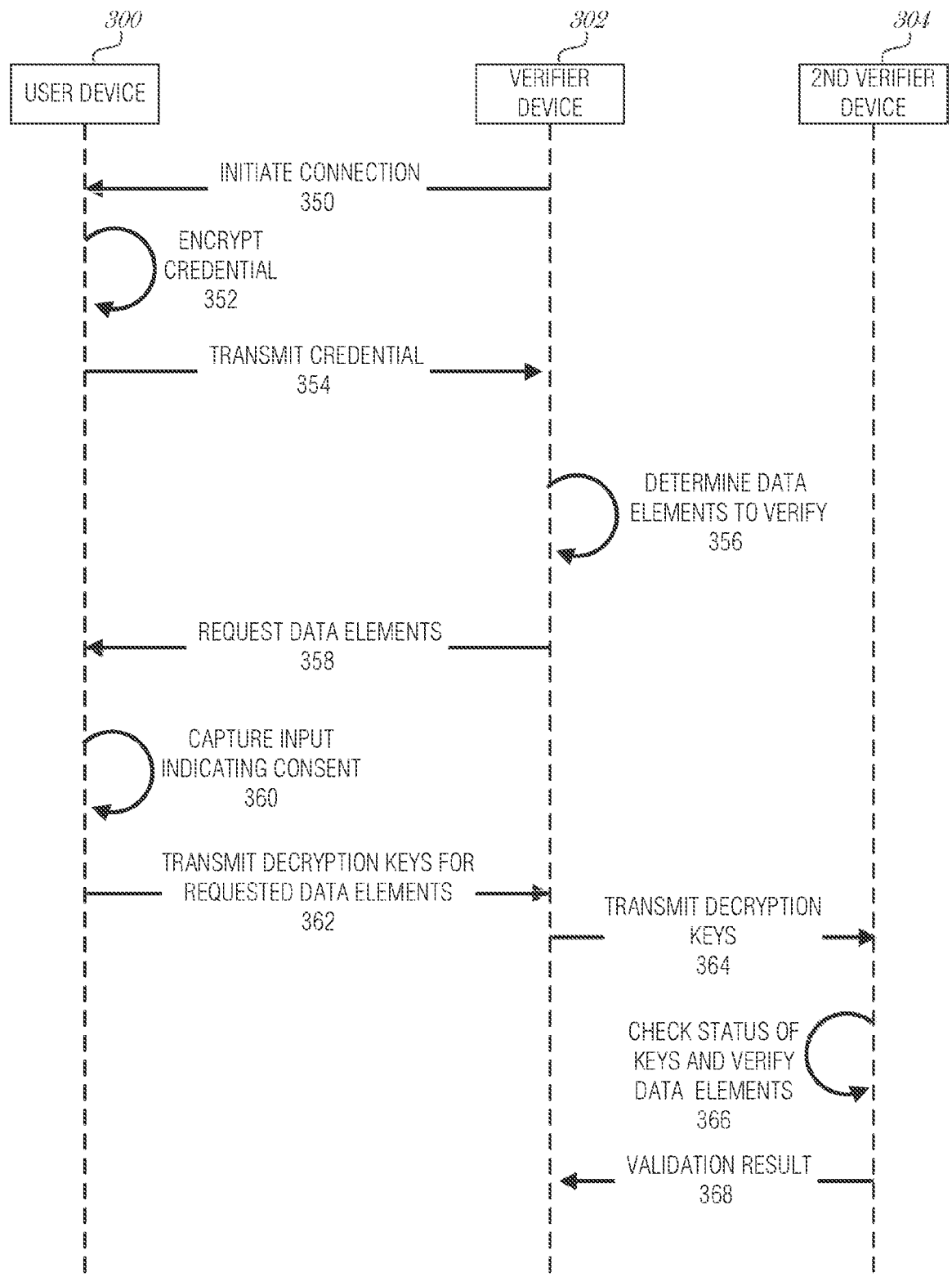
FIG. 3 is a message sequence diagram illustrating an interaction between a user device and a verifier device, according to another embodiment.

FIG. 3 is a message sequence diagram illustrating an interaction between a user device 300 and a verifier device 302, according to an embodiment. While the various processes will be described in accordance with illustrative steps performed in a particular order, it should be appreciated that embodiments of the present disclosure are not so limited and that any of the process steps depicted and described herein can be performed in any order or in parallel with one another.

Similar to the transaction illustrated in FIG. 2, the verifier device 302 is used to validate a credential received from the user device 300. In the embodiment illustrated in FIG. 3, the verifier device 302 uses a secondary verifier device 304 to perform at least part of the validation. The secondary verifier device 304 may be a server, cloud service, or other compute device. The secondary verifier device 304 may be co-located with the verifier device 302, such as in a configuration where the verifier device 302 is in a storefront area and the secondary verifier device 304 is a server room. The secondary verifier device 304 may be more remotely located from the verifier device 302, such as over a wide-area network (WAN) like the Internet. The transaction flow is as follows.

As with the embodiment illustrated in FIG. 2, when a user device 300 is within wireless communication range of a verifier device 302, the verifier device 302 may initiate a wireless connection (operation 350). The wireless connection may be formed over any type of wireless communication protocol including, but not limited to BLUETOOTH®, BLUETOOTH LOW ENERGY (BLE), WI-FI, ZIGBEE, or the like.

The user device 300 encrypts each data element in a credential using a separate, independent encryption key (operation 352). The encryption may be performed before, during, or after the wireless connection is formed in operation 350. The encryption may be performed using an ephemeral key. An ephemeral key is typically a single-use key for a single session or interaction. An ephemeral key may be a symmetric key or an asymmetric key (Public Key Infrastructure (PKI)).

The user device 300 transmits all of the contents of the credential to the verifier device 302 as separately encrypted data elements (operation 354). The transmission operation (operation 354) may be conditioned on a triggering event, as described above in FIG. 2.

After receiving the parts of the credential, the verifier device 302 determines which data elements are needed to verify the user device 300 (operation 356). This may be performed as described above in FIG. 2. The verifier device 302 then transmits data or instructions to the user device 300 to initiate the user device 300 to prompt the user of the user device 302 for consent to share the needed data elements (operation 358).

The user may indicate consent via the user interface presented on the user device 300 (operation 360) and the user device 300 transmits the decryption keys for those data elements to the verifier device 302 (operation 362). The decryption keys are transmitted to the verifier device 302 in operation 362. The decryption keys may be one-time use keys, ephemeral keys, limited time keys, or other short-term or limited-use keys Once the verifier device 302 obtains the keys for the requested data elements, the data elements are decrypted and verified.

In order to decrypt the data elements, the verifier device 302 transmits the decryption keys to a secondary verifier device 304 (operation 364). Optionally, the verifier device 302 may also transmit the encrypted portions of the credential to the secondary verifier device 304. The secondary verifier device 304 checks the status of the decryption keys and decrypts the corresponding portions of the credential (operation 366). The unencrypted portions may be transmitted back to the verifier device 304 for verification. Alternatively, the secondary verifier device 306 may perform some or all of the credential verification. The results of the verification or the unencrypted data elements are transmitted to the verifier device 302 (operation 368). Optionally the data elements may be encrypted when sent from the secondary verifier device 304 to the verifier device 302 using an encryption scheme agreed upon between the secondary verifier device 304 and the verifier device 302 to maintain security during the communication.

The secondary verifier device 304 may maintain a key repository that includes the operating status of various decryption keys. The keys may have expiration dates or times, operational dates or time ranges, geographical constraints, or other limitations or policies that control how or when a decryption key may be used. The secondary verifier device 304 is used to control how long or when a decryption key may be used. In this configuration, a user is guaranteed that a decryption key provided to a verifying agent is only available for a certain time after it is provided. In other words, encrypted data elements are made available for a limited time or for a limited number of decryptions. This is an extra layer of security to ensure that an encrypted data element is not available forever at a verifier device 304 because the key to decrypt the data element is expired after a certain time. Other policies may be used to secure the cleartext (e.g., unencrypted) forms of the data elements while they are being verified.

Figure 4:
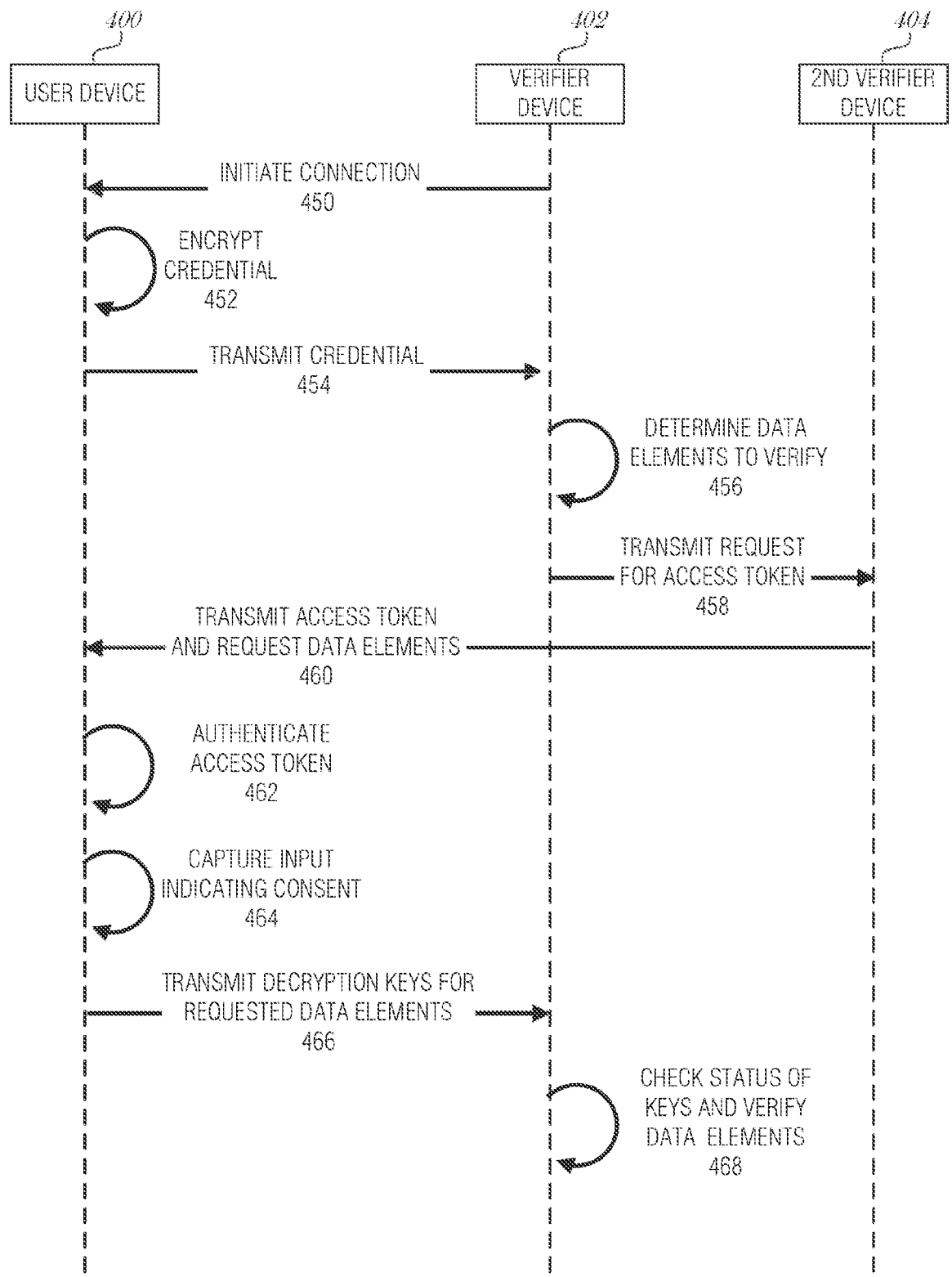
FIG. 4 is a message sequence diagram illustrating an interaction between a user device and a verifier device, according to another embodiment.

FIG. 4 is a message sequence diagram illustrating an interaction between a user device 400 and a verifier device 402, according to another embodiment. While the various processes will be described in accordance with illustrative steps performed in a particular order, it should be appreciated that embodiments of the present disclosure are not so limited and that any of the process steps depicted and described herein can be performed in any order or in parallel with one another.

Similar to the transaction illustrated in FIGS. 2 and 3, the verifier device 402 is used to validate a credential received from the user device 400. In the embodiment illustrated in FIG. 4, the verifier device 402 uses a secondary verifier device 404 as part of the validation operation. The secondary verifier device 404 may be a server, cloud service, or other compute device. The secondary verifier device 404 may be co-located with the verifier device 402 or may be more remotely located from the verifier device 402, such as over a wide-area network (WAN) like the Internet. The transaction flow is as follows.

As with the embodiment illustrated in FIG. 2, when a user device 400 is within wireless communication range of a verifier device 402, the verifier device 402 may initiate a wireless connection (operation 450). The wireless connection may be formed over any type of wireless communication protocol including, but not limited to BLUETOOTH®, BLUETOOTH LOW ENERGY (BLE), WI-FI, ZIGBEE, or the like.

The user device 400 encrypts each data element in a credential using a separate, independent encryption key (operation 452). The encryption may be performed before, during, or after the wireless connection is formed in operation 450. The encryption may be performed using an ephemeral key. An ephemeral key is typically a single-use key for a single session or interaction. An ephemeral key may be a symmetric key or an asymmetric key (Public Key Infrastructure (PKI)).

The user device 400 transmits all of the contents of the credential to the verifier device 402 as separately encrypted data elements (operation 454). The transmission operation (operation 454) may be conditioned on a triggering event, as described above in FIG. 2.

After receiving the parts of the credential, the verifier device 402 determines which data elements are needed to verify the user device 400 (operation 456). This may be performed as described above in FIG. 2.

The verifier device 402 request an access token from the secondary verifier device 404 (operation 458). The request provides the identification of the user device 400 and identifies the portions of the credential that the verifier device 402 has determined it needs to verify in operation 456.

The secondary verifier device 404 transmits an access token to the user device 400 (operation 460), in response to the request of operation 456. The access token may be transmitted directly from the secondary verifier device 404 to the user device 400, or by using the verifier device 402 as a communication conduit, for example, by receiving the access token from the secondary verifier device 404 and relaying the access token to the user device 400. The access token is signed by the secondary verifier device 404. In operation 460, the secondary verifier device 404 also transmits information of which data elements are requested by the verifier device 402. This information may be relayed by the verifier device 402 in another implementation.

At operation 462, the user device 400 authenticates the access token. After verifying the access token, the user device 400 presents a user interface to prompt the user of the user device 400 for permission to share the requested data elements (operation 464). Capturing user consent in operation 464 may be optionally performed in some instances.

The user may indicate consent via the user interface presented on the user device 400 and the user device 400 transmits the decryption keys for the requested data elements to the verifier device 402 (operation 466). The decryption keys may be one-time use keys, ephemeral keys, limited time keys, or other short-term or limited-use keys Once the verifier device 402 obtains the keys for the requested data elements, the data elements are decrypted and verified (operation 468).

Figure 5:
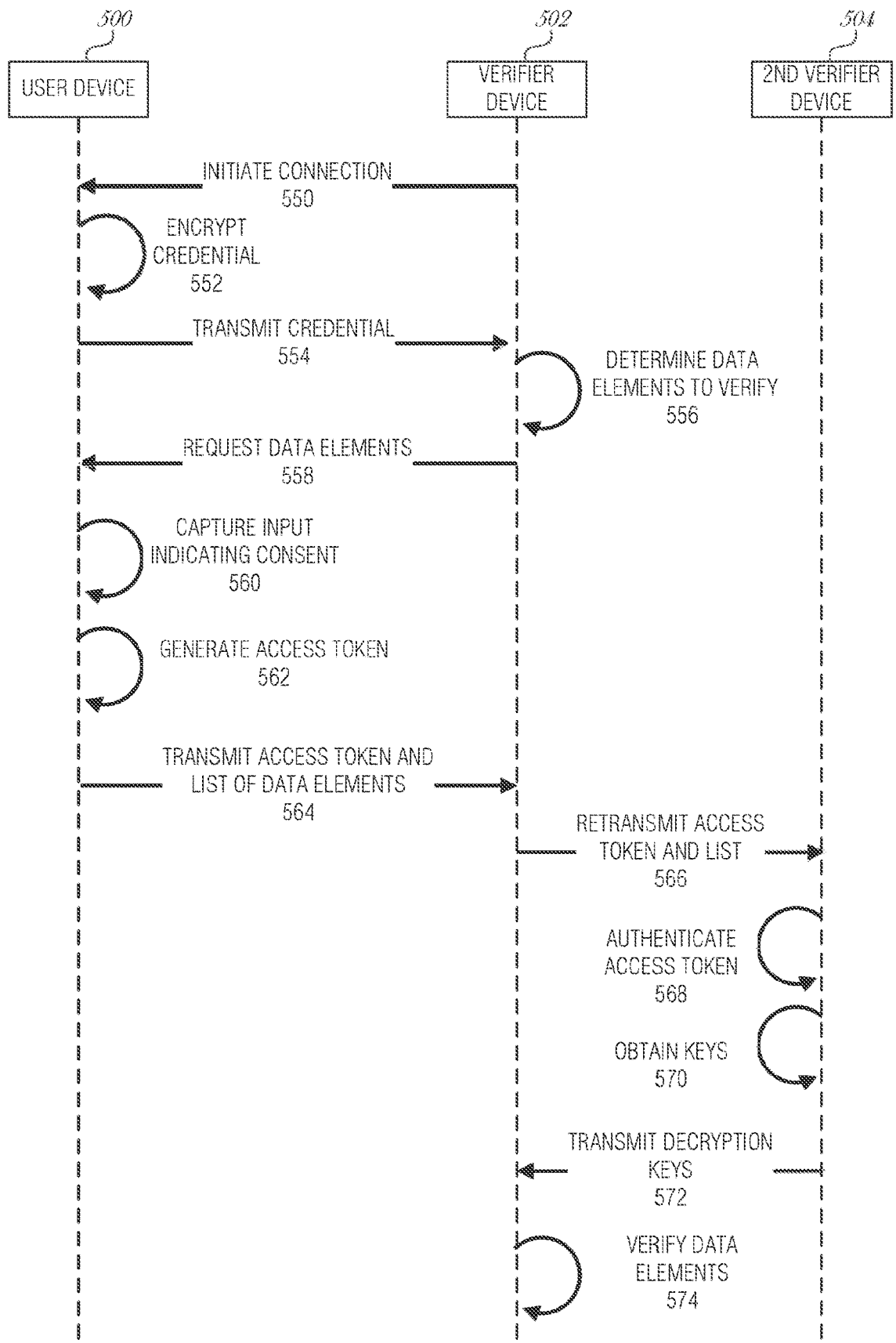
FIG. 5 is a message sequence diagram illustrating an interaction between a user device and a verifier device, according to another embodiment.

FIG. 5 is a message sequence diagram illustrating an interaction between a user device 500 and a verifier device 502, according to another embodiment. While the various processes will be described in accordance with illustrative steps performed in a particular order, it should be appreciated that embodiments of the present disclosure are not so limited and that any of the process steps depicted and described herein can be performed in any order or in parallel with one another.

Similar to the transaction illustrated in FIGS. 2-4, the verifier device 502 is used to validate a credential received from the user device 500. In the embodiment illustrated in FIG. 5, the verifier device 502 uses a secondary verifier device 504 as part of the validation operation. The secondary verifier device 504 may be a server, cloud service, or other compute device. The secondary verifier device 504 may be co-located with the verifier device 502 or may be more remotely located from the verifier device 502, such as over a wide-area network (WAN) like the Internet. The transaction flow is as follows.

As with the embodiment illustrated in FIG. 2, when a user device 500 is within wireless communication range of a verifier device 502, the verifier device 502 may initiate a wireless connection (operation 550). The wireless connection may be formed over any type of wireless communication protocol including, but not limited to BLUETOOTH®, BLUETOOTH LOW ENERGY (BLE), WI-FI, ZIGBEE, or the like.

The user device 500 encrypts each data element in a credential using a separate, independent encryption key (operation 552). The encryption may be performed before, during, or after the wireless connection is formed in operation 550. The encryption may be performed using an ephemeral key. An ephemeral key is typically a single-use key for a single session or interaction. An ephemeral key may be a symmetric key or an asymmetric key (Public Key Infrastructure (PKI)).

The user device 500 transmits all of the contents of the credential to the verifier device 502 as separately encrypted data elements (operation 554). The transmission operation (operation 554) may be conditioned on a triggering event, as described above in FIG. 2.

After receiving the parts of the credential, the verifier device 502 determines which data elements are needed to verify the user device 500 (operation 556). This may be performed as described above in FIG. 2.

The verifier device 502 then transmits data or instructions to the user device 500 to initiate the user device 500 to prompt the user of the user device 502 for consent to share the needed data elements (operation 558).

The user device 500 captures the user input consenting to share some or all of the data elements requested by the verifier device 502 (operation 560). At operation 562, the user device 500 generates an access token. The access token may be signed by the user device 500 and includes a list of the data elements that the user consented to share. In an embodiment, the access token includes key derivation information (e.g., random transactional nonce) used by the secondary verifier device to generate the decryption key.

The access token is transmitted to the verifier device 502 (operation 564). The verifier device 502 retransmits the access token and list of data elements to the secondary verifier device 504 (operation 566).

At operation 568, the secondary verifier device 504 authenticates the access token. If the access token is authenticated, then the secondary verifier device 504 analyzes the list of data elements and obtains the corresponding decryption keys (operation 570). The decryption keys may be stored in a secure container. The decryption keys may be ephemeral keys. The decryption keys may be derived using key derivation schemes from shared master keys between the user device 500 and the secondary verifier device 504 and made ephemeral with a random transaction nonce that was previously transmitted from the user device 500 using the access token. The secondary verifier device 504 transmits the appropriate decryption keys to the verifier device 502 (operation 572) to decrypt portions of the credential and verify the data elements (operation 574).

Operations

Figure 6:
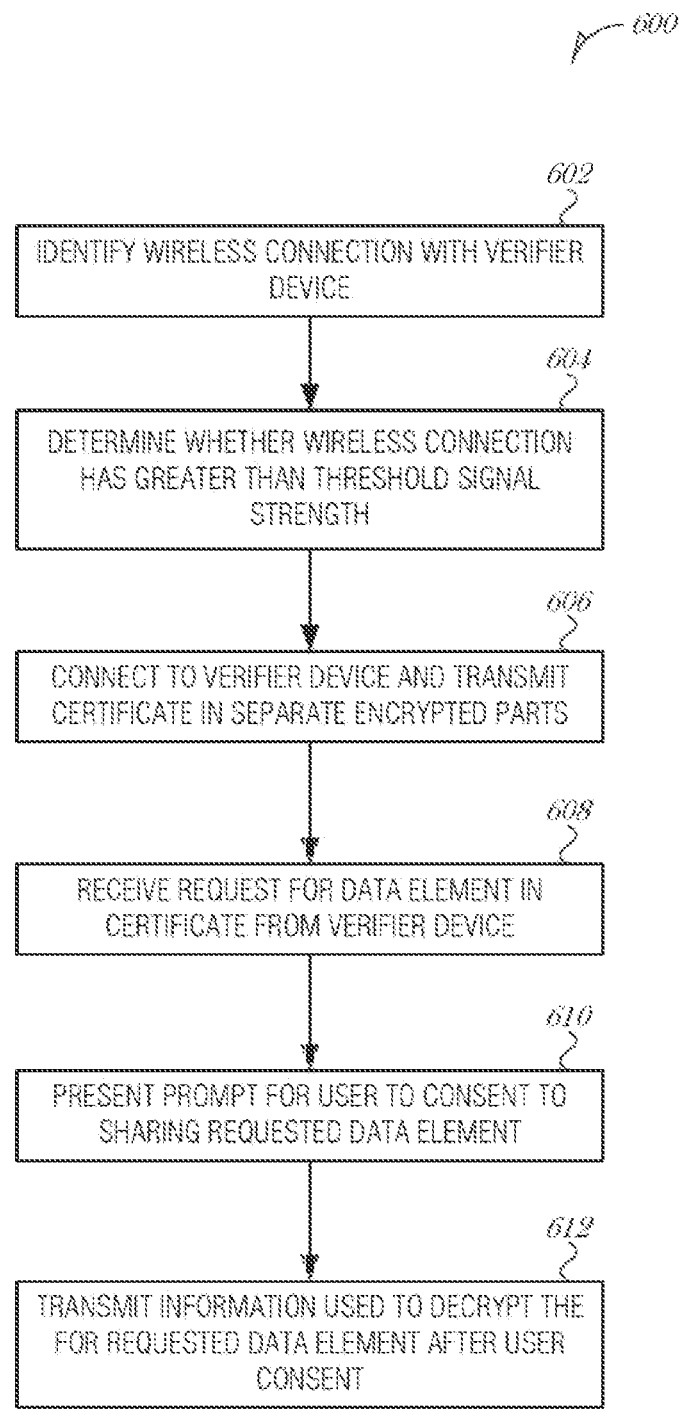
FIG. 6 is a flowchart illustrating a method of securely transmitting user credential data, according to an embodiment.

FIG. 6 is a flowchart illustrating a method 600 of securely transmitting user credential data, according to an embodiment. The method 600 begins at operation 602, where before the user and the verifying agent begin to interact, a verifier device having an available wireless connection is identified. The wireless connection having a wireless connection strength.

At operation 604, it is determined, again before the user and the verifying agent begin to interact, that a triggering event occurs, the triggering event based on the wireless connection strength. In an embodiment, the triggering event is that the wireless connection strength is greater than a threshold amount.

At operation 606, when the triggering event occurs, and before the user and the verifying agent begin to interact, the mobile device connects to the verifier device and transmits a digital credential to the verifier device. The digital credential includes a plurality of data elements, each of plurality of data elements are separately encrypted parts and, each of the plurality of data elements are encrypted using distinct encryption keys. The parts are transmitted.

In an embodiment, the triggering event comprises the wireless connection strength is greater than a threshold amount. In another embodiment, the triggering event comprises a rate of change of the wireless connection strength is greater than a threshold amount. In another embodiment, the triggering event comprises a difference between the wireless connection strength and a second wireless connection strength of a second verifier device is greater than a threshold amount.

In an embodiment, the triggering event is determined by characteristics of the wireless connection between the verifier device and the mobile device, including time of flight or angle of arrival, that allows the verifier device or the mobile device to determine spatial vicinity between the verifier device and mobile device be smaller than a threshold distance.

In an embodiment, each of the plurality of data elements is encrypted using corresponding ephemeral keys.

In an embodiment, the wireless connection strength is measured using a received signal strength indicator. In an embodiment, the available wireless connection comprises a wireless protocol from the IEEE 802.15.1 family of standards.

At operation 608, after the user and the verifying agent begin to interact, a request to access a requested data element of the digital credential is received.

At operation 610, a user of the mobile device is prompted for consent to share the requested data element. When the user consents sharing the requested data element, information is transmitted to the verifier device, where the information is used to decrypt only the requested data element (operation 612). In a further embodiment, the verifier device is to verify the requested data element.

In an embodiment, the verifier device is to use a secondary verifier device to verify the requested data element. In a further embodiment, the verifier device is to transmit a request for an access token to the secondary verifier device, the secondary verifier device to generate and transmit the access token to the mobile device, and wherein the mobile device is to transmit the information to decrypt only the requested data element to the verifier device after authenticating the access token.

In an embodiment, the information includes a decryption key, the decryption key configured to decrypt only the requested data element.

In an embodiment, the information includes an access token generated by the mobile device, the access token used by the verifier device to access the requested data element.

In an embodiment, the verifier device is to transmit the access token to a secondary verifier device, which authenticates the access token and provides a decryption key to the verifier device to decrypt the requested data element.

Example Use Case

A user may be issued one or more credentials. For example, the user may be issued a government-issued digital credential (e.g., a driver's license, passport, or other credential demonstrating identity). The digital credential may include various data elements about the user, such as the user's name, address, physical characteristics, photograph, date of birth, biometric information (e.g., fingerprints), where the user has traveled, or the like. Additionally, the digital credential may include information about the issuer of the credential, such as the city, state, or country that issued the credential; the department, office, or agency that issued the credential; an expiration date or valid date range, a digital signature of the issuer; or the like. The credential may be stored on a user device, such as a mobile phone.

The user may be at an airport checking luggage. To check luggage, the user is required to show a boarding pass and identification (e.g., a license or passport) to a luggage attendant. Instead of showing the luggage attendant a form of physical identification, the user may present the digital credential.

As the user approaches the luggage attendant, the credential is transmitted to a verifier device used by the luggage attendant. The credential is transmitted in parts with each part separately encrypted using distinct keys. The luggage attendant is required to check that the name on the boarding pass matches the name on the identification and also check that the identification appears to be that of the user. In order to authenticate the identification, the luggage attendant examines the name field and a photo to compare to the user. As such, the verifier device requests access to the "name" data element and the "photograph" data element from the credential A prompt is provided to the user for consent to share the name and photo from the credential. When the user consents through interaction with the user interface, the decryption keys for only the name and photograph data elements is provided to the verifier device. As a result, the verifier device is able to decrypt these portions of the credential and present them in an unencrypted form to the luggage attendant.

Later, when the user is passing through the security gates to move from the check-in area to the concourse, a security guard may use a verifier device to check the user's name and area of origin. In this instance, the verifier device may request access to the "name" and "issuer" data elements to verify and authenticate the user's identity and credential. After consent is provided, the user device will transmit keys to decrypt the relevant data elements. As described above, the keys may be limited use keys.

Example System Components

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 7:
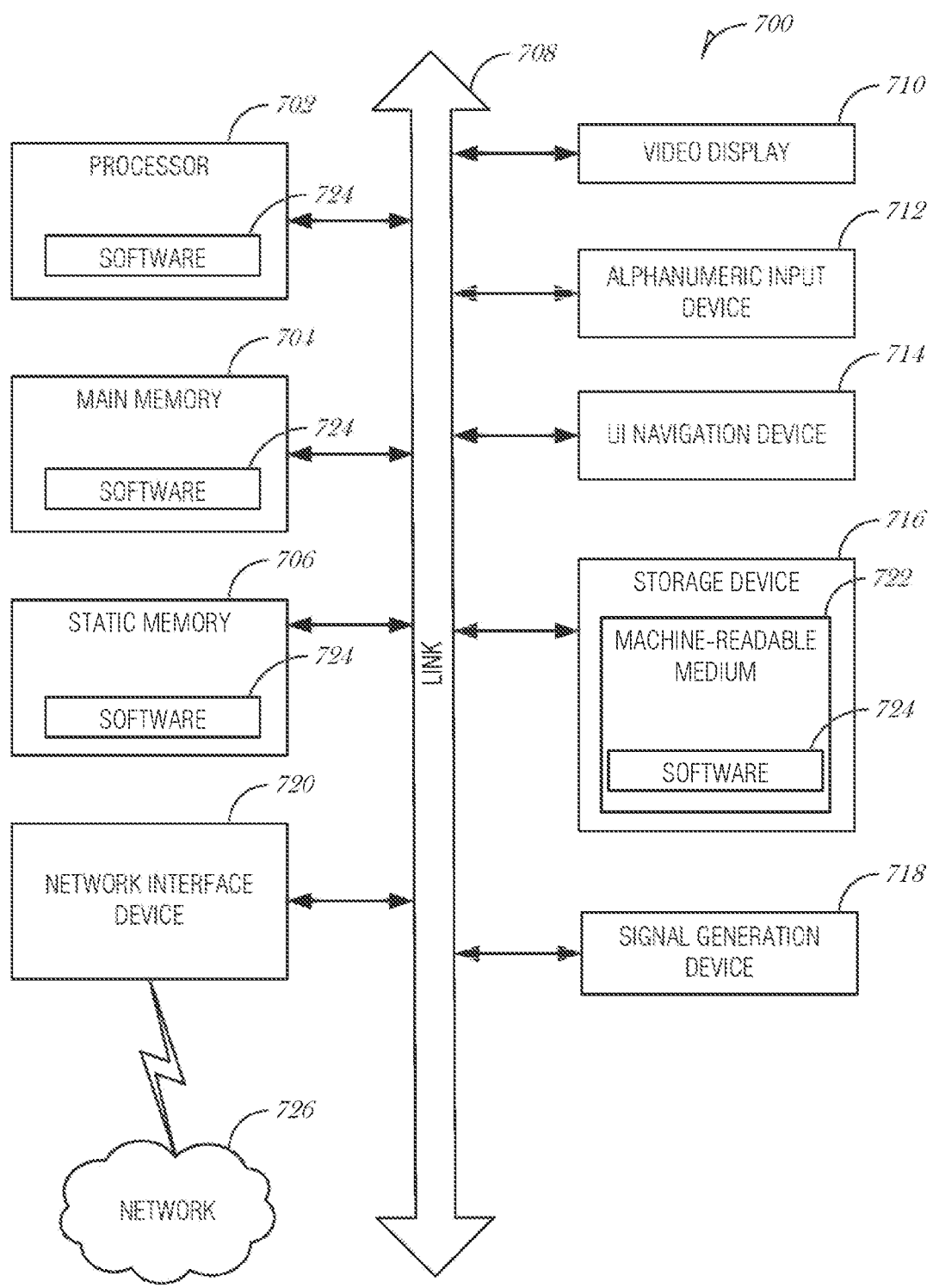
FIG. 7 is a block diagram illustrating an example machine upon which any one or more of the techniques (e.g., methodologies) discussed herein may perform, according to an embodiment.

FIG. 7 is a block diagram illustrating a machine in the example form of a computer system 700, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a mobile device, a personal computer (PC), a tablet PC, a hybrid tablet, a personal digital assistant (PDA), a mobile telephone, a kiosk, a beacon, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other type of sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a mobile device comprising: a memory device; and a processor subsystem, which when configured by instructions stored on the memory device, is operable to perform the operations comprising: identifying a verifier device having an available wireless connection, the wireless connection having a wireless connection strength; determining that a triggering event occurs, the triggering event based on the wireless connection strength; and when the triggering event occurs: connecting to the verifier device; transmitting a digital credential to the verifier device, wherein the digital credential includes, a plurality of data elements, and wherein transmitting the digital credential includes transmitting each of the plurality of data elements as separately encrypted parts, each of the plurality of data elements encrypted using distinct encryption keys; receiving a request to access a requested data element of the digital credential; prompting a user of the mobile device for consent to share the requested data element; and transmitting information to the verifier device when the user consents sharing the requested data element, the information used to decrypt only the requested data element.

In Example 2, the subject matter of Example 1 includes, wherein the triggering event is based on a proximity assessment representing a distance between the verifier device and the mobile device.

In Example 3, the subject matter of any one or more of Examples 1-2 includes, wherein the triggering event comprises the wireless connection strength is greater than a threshold amount.

In Example 4, the subject matter of any one or more of Examples 1-3 includes, wherein the triggering event comprises a rate of change of the wireless connection strength is greater than a threshold amount.

In Example 5, the subject matter of any one or more of Examples 1-4 includes, wherein the triggering event comprises a difference between the wireless connection strength and a second wireless connection strength of a second verifier device is greater than a threshold amount.

In Example 6, the subject matter of any one or more of Examples 1-5 includes, wherein the triggering event is determined by characteristics of the wireless connection between the verifier device and the mobile device, including time of flight or angle of arrival, that allows the verifier device or the mobile device to determine spatial vicinity between the verifier device and mobile device be smaller than a threshold distance.

In Example 7, the subject matter of any one or more of Examples 1-6 includes, wherein connecting to the verifier device uses a different wireless connection than the wireless connection used to determine the triggering event.

In Example 8, the subject matter of any one or more of Examples 1-6 includes, wherein connecting to the verifier device uses the same wireless connection as the wireless connection used to determine the triggering event.

In Example 9, the subject matter of any one or more of Examples 1-8 includes, wherein each of the plurality of data elements is encrypted using corresponding ephemeral keys.

In Example 10, the subject matter of any one or more of Examples 1-9 includes, wherein the wireless connection strength is measured using a received signal strength indicator.

In Example 11, the subject matter of any one or more of Examples 1-10 includes, wherein the available wireless connection comprises a wireless protocol from the IEEE 802.15.1 family of standards.

In Example 12, the subject matter of any one or more of Examples 1-11 includes, wherein the verifier device is to verify the requested data element.

In Example 13, the subject matter of any one or more of Examples 1-12 includes, wherein the verifier device is to use a secondary verifier device to verify the requested data element.

In Example 14, the subject matter of Example 13 includes, wherein the verifier device is to transmit a request for an access token to the secondary verifier device, the secondary verifier device to generate and transmit the access token to the mobile device, and wherein the mobile device is to transmit the information to decrypt only the requested data element to the verifier device after authenticating the access token.

In Example 15, the subject matter of any one or more of Examples 1-14 includes, wherein the information includes a decryption key, the decryption key configured to decrypt only the requested data element.

In Example 16, the subject matter of any one or more of Examples 1-15 includes, wherein the information includes an access token generated by the mobile device, the access token used by the verifier device to access the requested data element.

In Example 17, the subject matter of Example 16 includes, wherein the verifier device is to transmit the access token to a secondary verifier device, which authenticates the access token and provides a decryption key to the verifier device to decrypt the requested data element.

In Example 18, the subject matter of Example 17 includes, wherein the access token includes key derivation information used by the secondary verifier device to generate the decryption key.

Example 19 is a method of securely transmitting user credential data between a user device operated by a user and a verifier device operated by a verifying agent, comprising: identifying, before the user and the verifying agent begin to interact, a verifier device having an available wireless connection, the wireless connection having a wireless connection strength; determining, before the user and the verifying agent begin to interact, that a triggering event occurs, the triggering event based on the wireless connection strength; when the triggering event occurs, and before the user and the verifying agent begin to interact: connecting to the verifier device and transmitting a digital credential to the verifier device, wherein the digital credential includes, a plurality of data elements, and wherein transmitting the digital credential includes transmitting each of the plurality of data elements as separately encrypted parts, each of the plurality of data elements encrypted using distinct encryption keys; receiving, after the user and the verifying agent begin to interact, a request to access a requested data element of the digital credential; prompting a user of the mobile device for consent to share the requested data element; and transmitting information to the verifier device when the user consents sharing the requested data element, the information used to decrypt only the requested data element.

In Example 20, the subject matter of Example 19 includes, wherein the triggering event is based on a proximity assessment representing a distance between the verifier device and the mobile device.

In Example 21, the subject matter of any one or more of Examples 19-20 includes, wherein the triggering event comprises the wireless connection strength is greater than a threshold amount.

In Example 22, the subject matter of any one or more of Examples 19-21 includes, wherein the triggering event comprises a rate of change of the wireless connection strength is greater than a threshold amount.

In Example 23, the subject matter of any one or more of Examples 19-22 includes, wherein the triggering event comprises a difference between the wireless connection strength and a second wireless connection strength of a second verifier device is greater than a threshold amount.

In Example 24, the subject matter of any one or more of Examples 19-23 includes, wherein the triggering event is determined by characteristics of the wireless connection between the verifier device and the mobile device, including time of flight or angle of arrival, that allows the verifier device or the mobile device to determine spatial vicinity between the verifier device and mobile device be smaller than a threshold distance.

In Example 25, the subject matter of any one or more of Examples 19-24 includes, wherein connecting to the verifier device uses a different wireless connection than the wireless connection used to determine the triggering event.

In Example 26, the subject matter of any one or more of Examples 19-25 includes, wherein connecting to the verifier device uses the same wireless connection as the wireless connection used to determine the triggering event.

In Example 27, the subject matter of any one or more of Examples 19-25 includes, wherein each of the plurality of data elements is encrypted using corresponding ephemeral keys.

In Example 28, the subject matter of any one or more of Examples 19-27 includes, wherein the wireless connection strength is measured using a received signal strength indicator.

In Example 29, the subject matter of any one or more of Examples 19-28 includes, wherein the available wireless connection comprises a wireless protocol from the IEEE 802.15.1 family of standards.

In Example 30, the subject matter of any one or more of Examples 19-29 includes, wherein the verifier device is to verify the requested data element.

In Example 31, the subject matter of any one or more of Examples 19-30 includes, wherein the verifier device is to use a secondary verifier device to verify the requested data element.

In Example 32, the subject matter of Example 31 includes, wherein the verifier device is to transmit a request for an access token to the secondary verifier device, the secondary verifier device to generate and transmit the access token to the mobile device, and wherein the mobile device is to transmit the information to decrypt only the requested data element to the verifier device after authenticating the access token.

In Example 33, the subject matter of any one or more of Examples 18-32 includes, wherein the information includes a decryption key, the decryption key configured to decrypt only the requested data element.

In Example 34, the subject matter of any one or more of Examples 18-33 includes, wherein the information includes an access token generated by the mobile device, the access token used by the verifier device to access the requested data element.

In Example 35, the subject matter of Example 34 includes, wherein the verifier device is to transmit the access token to a secondary verifier device, which authenticates the access token and provides a decryption key to the verifier device to decrypt the requested data element.

In Example 36, the subject matter of Example 35 includes, wherein the access token includes key derivation information used by the secondary verifier device to generate the decryption key.

Example 37 is a non-transitory computer-readable medium including instructions for securely transmitting user credential data between a user device operated by a user and a verifier device operated by a verifying agent, which when executed by the user device cause the user device to perform operations comprising: identifying, before the user and the verifying agent begin to interact, a verifier device having an available wireless connection, the wireless connection having a wireless connection strength; determining, before the user and the verifying agent begin to interact, that a triggering event occurs, the triggering event based on the wireless connection strength; when the triggering event occurs, and before the user and the verifying agent begin to interact, connecting to the verifier device and transmitting a digital credential to the verifier device, wherein the digital credential includes, a plurality of data elements, and wherein transmitting the digital credential includes transmitting each of the plurality of data elements as separately encrypted parts, each of the plurality of data elements encrypted using distinct encryption keys; receiving, after the user and the verifying agent begin to interact, a request to access a requested data element of the digital credential; prompting a user of the mobile device for consent to share the requested data element; and transmitting information to the verifier device when the user consents sharing the requested data element, the information used to decrypt only the requested data element.

In Example 38, the subject matter of Example 37 includes, wherein the triggering event is based on a proximity assessment representing a distance between the verifier device and the mobile device.

In Example 39, the subject matter of any one or more of Examples 37-38 includes, wherein the triggering event comprises the wireless connection strength is greater than a threshold amount.

In Example 40, the subject matter of any one or more of Examples 37-39 includes, wherein the triggering event comprises a rate of change of the wireless connection strength is greater than a threshold amount.

In Example 41, the subject matter of any one or more of Examples 37-40 includes, wherein the triggering event comprises a difference between the wireless connection strength and a second wireless connection strength of a second verifier device is greater than a threshold amount.

In Example 42, the subject matter of any one or more of Examples 37-41 includes, wherein the triggering event is determined by characteristics of the wireless connection between the verifier device and the mobile device, including time of flight or angle of arrival, that allows the verifier device or the mobile device to determine spatial vicinity between the verifier device and mobile device be smaller than a threshold distance.

In Example 43, the subject matter of any one or more of Examples 37-42 includes, wherein connecting to the verifier device uses a different wireless connection than the wireless connection used to determine the triggering event.

In Example 44, the subject matter of any one or more of Examples 37-42 includes, wherein connecting to the verifier device uses the same wireless connection as the wireless connection used to determine the triggering event.

In Example 45, the subject matter of any one or more of Examples 37-44 includes, wherein each of the plurality of data elements is encrypted using corresponding ephemeral keys.

In Example 46, the subject matter of any one or more of Examples 37-45 includes, wherein the wireless connection strength is measured using a received signal strength indicator.

In Example 47, the subject matter of any one or more of Examples 37-46 includes, wherein the available wireless connection comprises a wireless protocol from the IEEE 802.15.1 family of standards.

In Example 48, the subject matter of any one or more of Examples 37-47 includes, wherein the verifier device is to verify the requested data element.

In Example 49, the subject matter of any one or more of Examples 37-48 includes, wherein the verifier device is to use a secondary verifier device to verify the requested data element.

In Example 50, the subject matter of Example 49 includes, wherein the verifier device is to transmit a request for an access token to the secondary verifier device, the secondary verifier device to generate and transmit the access token to the mobile device, and wherein the mobile device is to transmit the information to decrypt only the requested data element to the verifier device after authenticating the access token.

In Example 51, the subject matter of any one or more of Examples 37-50 includes, wherein the information includes a decryption key, the decryption key configured to decrypt only the requested data element.

In Example 52, the subject matter of any one or more of Examples 37-51 includes, wherein the information includes an access token generated by the mobile device, the access token used by the verifier device to access the requested data element.

In Example 53, the subject matter of Example 52 includes, wherein the verifier device is to transmit the access token to a secondary verifier device, which authenticates the access token and provides a decryption key to the verifier device to decrypt the requested data element.

| In Example 54, the subject matter of Example 53 includes, wherein the access token includes key derivation information used by the secondary verifier device to generate the decryption key.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A verifier device comprising:
    memory; and
    at least one processor, which when configured by instructions stored on the memory, is operable to perform the operations comprising:
        interrogating a user device over a wireless connection for a digital credential;
        receiving the digital credential from the user device, wherein the digital credential includes a plurality of data elements, the plurality of data elements received as a plurality of separately encrypted parts, each of the separately encrypted parts comprising one or more of the data elements;
        determining which of the data elements are to be used to verify the user device;
        transmitting a request to the user device for access to one or more of the data elements that are determined to be used to verify the user device; and
        receiving information from the user device, the information enabling decryption of one or more of the separately encrypted parts comprising the one or more data elements corresponding to the request.

2. The verifier device of claim 1, wherein the operations further comprise:
    decrypting the one or more separately encrypted parts comprising the one or more data elements corresponding to the request using the information received from the user device; and
    verifying the user device based on the one or more data elements corresponding to the request.

3. The verifier device of claim 2, wherein verifying the user device is performed in conjunction with a secondary verifier device.

4. The verifier device of claim 1, wherein the operations further comprise:
    transmitting at least a portion of the digital credential and the information received from the user device to a secondary verifier device, wherein the secondary verifier device is configured to decrypt one or more of the separately encrypted parts based on the information received from the user device;
    receiving one or more data elements from the secondary verifier device; and
    verifying the user device based on the one or more data elements.

5. The verifier device of claim 1, wherein the operations further comprise:
    transmitting at least a portion of the digital credential and the information received from the user device to a secondary verifier device; and
    receiving a result of verification of the user device from the secondary verifier device.

6. The verifier device of claim 1, wherein transmitting the request to the user device for access to one or more of the data elements that are determined to be used to verify the user device comprises transmitting a request for a secondary verifier device to transmit an access token along with information corresponding to the one or more of the data elements that are determined to be used to verify the user device.

7. The verifier device of claim 1, wherein the information received from the user device comprises an access token, and wherein the operations further comprise:
    transmitting the access token to a secondary verifier device; and
    receiving one or more decryption keys from the secondary verifier device for decrypting the one or more separately encrypted parts comprising the one or more data elements corresponding to the request using the information received from the user device.

8. The verifier device of claim 7, wherein the access token comprises key derivation information enabling the secondary verifier device to generate the one or more decryption keys.

9. The verifier device of claim 7, wherein the operations further comprise:
decrypting the one or more separately encrypted parts comprising the one or more data elements corresponding to the request using the one or more decryption keys received from the secondary verifier device; and
verifying the user device based on the data elements corresponding to the request.

10. The verifier device of claim 1, wherein each of the plurality of separately encrypted parts is encrypted using an independent encryption key.

11. The verifier device of claim 1, wherein the operations further comprise:
assessing a signal strength of a wireless signal of the user device; and
determining that a triggering event occurred based on the signal strength;
wherein interrogating the user device over the wireless connection for the digital credential occurs in response to the triggering event.

12. The verifier device of claim 11, wherein the triggering event comprises the signal strength being greater than a threshold amount.

13. The verifier device of claim 11, wherein the triggering event comprises a rate of change of the signal strength being greater than a threshold amount.

14. A method for securely receiving a digital credential from a user device, the method comprising:
interrogating the user device over a wireless connection for the digital credential;
receiving the digital credential from the user device, wherein the digital credential includes a plurality of data elements, the plurality of data elements received as a plurality of separately encrypted parts, each of the separately encrypted parts comprising one or more of the data elements;
determining which of the data elements are to be used to verify the user device;
transmitting a request to the user device for access to one or more of the data elements that are determined to be used to verify the user device; and
receiving information from the user device, the information enabling decryption of one or more of the separately encrypted parts comprising the one or more data elements corresponding to the request.

15. The method of claim 14, further comprising:
decrypting the one or more separately encrypted parts comprising the one or more data elements corresponding to the request using the information received from the user device; and
verifying the user device based on the one or more data elements corresponding to the request.

16. The method of claim 14, further comprising:
transmitting at least a portion of the digital credential and the information received from the user device to a secondary verifier device, wherein the secondary verifier device is configured to decrypt one or more of the separately encrypted parts based on the information received from the user device;
receiving one or more data elements from the secondary verifier device; and
verifying the user device based on the one or more data elements.

17. The method of claim 14, further comprising:
transmitting at least a portion of the digital credential and the information received from the user device to a secondary verifier device; and
receiving a result of verification of the user device from the secondary verifier device.

18. The method of claim 14, wherein transmitting the request to the user device for access to one or more of the data elements that are determined to be used to verify the user device comprises transmitting a request for a secondary verifier device to transmit an access token along with information corresponding to the one or more of the data elements that are determined to be used to verify the user device.

19. The method of claim 14, wherein the information received from the user device comprises an access token, and the method further comprises:
transmitting the access token to a secondary verifier device; and
receiving one or more decryption keys from the secondary verifier device for decrypting the one or more separately encrypted parts comprising the one or more data elements corresponding to the request using the information received from the user device.

20. A non-transitory computer-readable medium including instructions for securely receiving a digital credential from a user device, which when executed by a verifier device, cause the verifier device to perform operations comprising:
interrogating the user device over a wireless connection for the digital credential;
receiving the digital credential from the user device, wherein the digital credential includes a plurality of data elements, the plurality of data elements received as a plurality of separately encrypted parts, each of the separately encrypted parts comprising one or more of the data elements;
determining which of the data elements are to be used to verify the user device;
transmitting a request to the user device for access to one or more of the data elements that are determined to be used to verify the user device; and
receiving information from the user device, the information enabling decryption of one or more of the separately encrypted parts comprising the one or more data elements corresponding to the request.

* * * * *